United States Patent [19]

Muser

[11] Patent Number: 4,783,099

[45] Date of Patent: Nov. 8, 1988

[54] FLUID FLOW CONDUIT SYSTEMS

[76] Inventor: Oscar P. Muser, 1054 South Service Road East, Oakville, Ontario, Canada, L6J 2X7

[21] Appl. No.: 941,354

[22] Filed: Dec. 15, 1986

[30] Foreign Application Priority Data

Dec. 17, 1985 [CA] Canada .................................. 497,894

[51] Int. Cl.⁴ ............................................. F16L 55/00
[52] U.S. Cl. ........................................... 285/7; 285/93; 285/179; 285/383; 285/417; 285/915; 285/369
[58] Field of Search ................... 285/7, 93, 383, 179, 285/417, 915, 369

[56] References Cited

U.S. PATENT DOCUMENTS

| | | |
|---|---|---|
| 873,300 | 12/1907 | Cranston .......................... 285/93 X |
| 1,644,553 | 10/1927 | Trout .............................. 285/417 X |
| 2,272,811 | 2/1942 | Nathan ........................... 285/383 X |
| 2,786,696 | 3/1957 | Feldmeier ........................ 285/93 X |
| 3,481,633 | 12/1969 | Schönholzer . | 
| 3,568,240 | 3/1971 | Hamrick . |
| 3,594,021 | 7/1971 | Williams .......................... 285/93 X |
| 3,682,500 | 8/1972 | Hamrick .......................... 285/7 |
| 3,908,208 | 9/1975 | McIlny ............................ 285/93 X |

FOREIGN PATENT DOCUMENTS 1066505  6/1954  France .................................. 285/383
1554304  9/1975  United Kingdom .

OTHER PUBLICATIONS

Patent Abstracts of Japan vol. 2, No. 63(M-78).

Primary Examiner—Dave W. Arola
Attorney, Agent, or Firm—Peter L. Beck; Russel S. Smart; Karen M. Gerken

[57] ABSTRACT

A conduit system for the flow of a fluid medium therethrough wherein the system is made up of a plurality of elongated conduit segments connected by means of fittings, such as straight connectors, elbows, T's or the like. The conduit segments are composed of opaque material and the fittings are composed of transparent material.

6 Claims, 3 Drawing Sheets

FLUID FLOW CONDUIT SYSTEMS

This invention relates to fluid flow conduit systems of the type composed of a plurality of elongated tubular conduit segments interconnected between at least one inlet and at least one outlet by means of a plurality of fittings adapted for the flow of fluid therethrough.

This invention is particularly suited to central vacuum cleaning installations for residential or commercial applications in which the fluid medium is air. Such installations usually consist of a central suction or power unit which is connected through a conduit system to entry or inlet valves disposed throughout the building in which the central vacuum system is housed. Typically the conduit systems are composed of a plurality of straight polyvinyl chloride (PVC) tubular segments, and a plurality of PVC fittings in the nature of elbows, T's and straight connectors adapted to interconnect two or more tubular conduit segments in fluid flow relationship. The fittings usually comprise at least one internal socket adapted to snugly receive an end of one of the conduit segments to the base of the socket, although in some cases the fitting will include a spigot adapted to be received within the socket of a second fitting, or within an end of one of the conduit segments, in which case the fitting is normally provided with an external radially disposed circumferential flange spaced inwardly from the open end of the spigot to provide a stop against which the end of a conduit segment or second fitting may abut.

It has been the practice in conduit systems of this type to utilize opaque PVC tubular conduit segments and opaque fittings therefore. However, particularly in the case of conduit systems for use in central vacuum cleaning systems, which characteristically are custom fabricated and installed on site, this has led to a problem for which there has as yet been no satisfactory solution. The fittings used in such systems are manufactured in such a way that, when a tubular conduit segment is adapted to be used with the fitting inserted therein, the end of the tubular segment will abut a radially disposed inner circumferential flange forming the base of the socket, the width of which corresponds to the thickness of the tubular walls of the conduit, so that an absolutely smooth transition is formed between the, inner surface of the conduit and the inner flow passage of the fitting when the conduit is properly seated therein. However, when such conduit systems are fabricated and installed in the field, it frequently occurs that particles of dirt, plastic chips, or similar foreign objects will be lodged between the end of the conduit segment and the abutment surface of the flange forming the base of the socket, so that when the conduit segment is inserted into the socket, the end of the conduit segment is prevented from abutting flush against the base of the socket, leaving a small gap between the two, and destroying the smooth transition between inner conduit segment surface and the inner flow passage through the fitting.

When fabricating and installing conduit systems of this type, it is invariably necessary to cut conduit segments to the desired length, because no two installations will be precisely the same, owing to different dimensions and characteristics of the buildings in which they are installed, different locations of the central vacuum power unit and the various inlet valves located throughout the building in which the system is installed, and different structural obstacles in such building which must be circumvented by an appropriate arrangement of the conduit segments. Accordingly, standard lengths of conduit must be cut to the appropriate length in the field to build up each individual system, and these lengths are connected into the system by means of the appropriate fittings. While every effort is made to ensure that the conduit segments are cut to produce a clean transverse cut at a right angle to the longitudinal axis of the conduit, this is frequently not achieved in practice, either because of insufficiently accurate or worn equipment, negligent, incompetent, or insufficiently skilled workmanship, or simply as a result of undue haste in completing the job. As a result, the cut conduit ends may be rough or irregular resulting in rough or irregular spaces being formed between the cut conduit end and the base of the socket of the fitting, or the conduit end may not be cut precisely at right angle to the longitudinal axis thereof, resulting in abutment of the conduit end at one point on the base of the socket, but leaving a gap of varying width between the conduit end and the socket base of the fitting at other locations.

One phenomenon which is frequently encountered in central vacuum installations is slip or creep. This occurs because the glue or solvent inserted between the conduit and the fittings acts as a lubricant. It assists in the insertion of the conduit completely into the fittings, but in certain circumstances, particularly if the conduit is slightly oversized, the fittings will tend to squeeze the conduit out and this is facilitated by the lubricant qualities of the glue or solvent. A similar effect occurs where a horizontal conduit between two material conduits is cut slightly too short; the inherent flexibility of the conduit will result in withdrawal of one or both ends of the horizontal conduit from the associated fitting—again assisted by the lubricant properties of the glue or solvent. In each case a gap between the conduit end and the base of the fitting socket results.

Such gaps, spaces, cracks or similar irregularities which destroy the smooth transition between the inner surface of the conduit segment and the inner flow surface of the fitting are the principal cause of blockage in conduit systems of this type. Particularly in the case of central vacuum systems, where the medium flowing through the system does not constitute a pure fluid, but, by design and function, includes dirt and dust of all kinds and forms, as well as a wide variety of small objects such as pins, toothpicks, matchbooks, cigarette butts, small children's toys, food crumbs, etc., it is almost a certainty that at some point in the life of such a system, gaps or irregularities in the flow path through the system will result in blockage thereof. Such gaps or irregularities tend to trap sharp or elongated objects such as toothpicks, pins, small sticks or slivers, even matchbooks or similar stiff paper or cardboard items, and, when one of such objects becomes lodged in the system, it traps and hinders the passage of other matter flowing through the system until there is a buildup which eventually results in complete blockage of the flow path. This blockage of course must be eliminated, which results in rather costly servicing, and may ultimately require replacement of certain portions of the system, and may even involve breaking through walls of the building to gain access to that portion of the system where the blockage has occurred.

I have found that such blockages can be virtually eliminated by the simple expedient of utilizing tubular conduit segments which are opaque, in conjunction with fittings which are preferably transparent in their entirety, or in which at least the complete socket components are transparent.

By this relatively simple expedient, it is possible for a workman to tell immediately upon insertion of a conduit segment into the socket of the fitting whether there is a flush abutment between the end of the conduit segment and the base of the socket. More importantly, because it is not always possible to rely upon workmen in the field to take the necessary time or care to ensure the work is properly done, it is possible for an inspector to come along after fabrication of the conduit system, but before operation is commenced or any structural work is undertaken which would cover up portions of the system, or enclose it within interior walls or the like, to check each individual joint to ensure that there is a precise flush fit between the conduit end and the base of the socket of the fitting to achieve an absolutely smooth transition from the inner flow surface of the conduit segment to the inner flow surface of the fitting. If such does not exist, then the defect can be corrected immediately before the system is put into operation. In this manner, it is possible to ensure that there is, at all joints, a smooth uninterrupted flow path with absolutely no gaps or irregularities which will eventually give rise to blockage.

As the flow passage through the interior of the tubular conduit segments is perfectly smooth, as is the flow passage through the interior of the fittings, the only points in such a system at which blockage can occur are the junctions between conduit segments and fittings, or between fittings where one is connected to the other through a spigot and complementary socket. If a smooth flow passage can be ensured at these points, then any such system should be free from blockage throughout its life. Accordingly, by employing the subject invention, it is possible for a fabricator and installer of such systems to absolutely guarantee that a system will be free of blockage throughout the life of the system, a guarantee which has hitherto been impossible.

In drawings which illustrate the invention.

Figure 1:
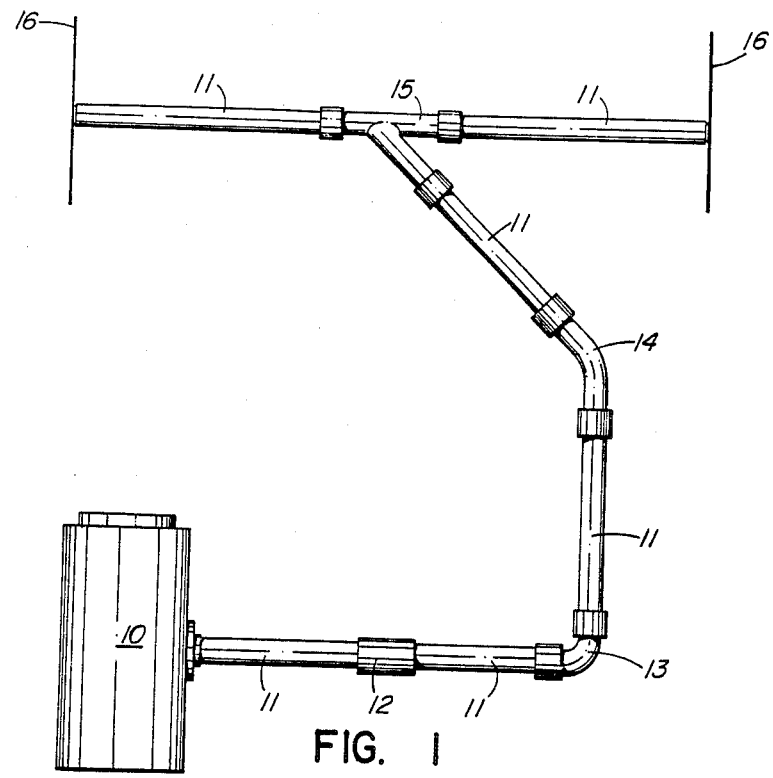
FIG. 1 is a schematic view of a portion of a typical central vacuum cleaner conduit system.

Referring now to the drawings, a typical portion of a central vacuum system comprises a central suction power unit 10 connected to wall face plates 16, incorporating inlet valves (not shown) through a conduit system which consists of a plurality of straight tubular conduit segments 11, usually of circular cross-section, interconnected through a variety of fittings such as a straight connector 12, a 90° elbow 13, a 45° elbow 14, and a 45° T or Y 15.

Figure 2:
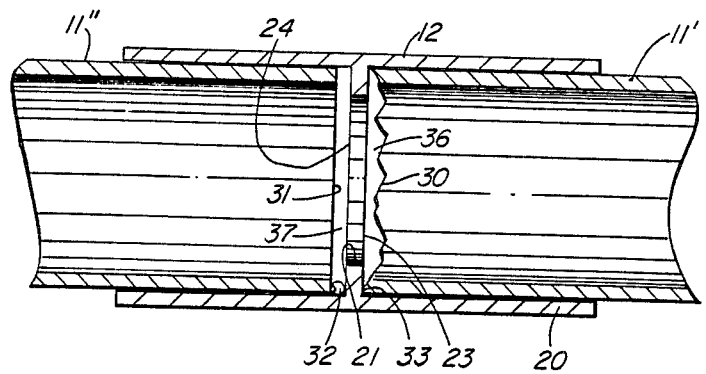
FIG. 2 is a cross-section of a straight connector fitting with the ends of two conduit segments inserted therein.

From FIG. 2, it will be seen that the straight connector 12 consists of a tubular body portion 20 and a centrally located radially projecting circumferential inner flange 21 having abutment surfaces 23 and 24. The two sockets formed by the flange abutment surfaces 23 and 24 and the inner surfaces of the tubular body portion 20 receive the ends 30 and 31 of conduit segments 11' and 11" respectively. In the case of conduit 11', the end 30 is irregular and jagged, with the result that it does not lie flush with the base of the socket, or flange abutment surface 23, but touches the base at some points, such as 33, but is spaced relatively far therefrom at other points to leave a relatively large gap or space as at 36. In contrast, the end 31 of conduit segment 11" is cut perfectly straight and smooth. However, a particle 32 has become lodged between the end 31 of the conduit segment and the base of the socket, or abutment surface 24 of the flange, to create an annular gap 37 between the base of the socket and the end of the conduit segment.

A connection such as that depicted in FIG. 2 would inevitably lead to a blockage of the central vacuum cleaning conduit system at some point during its life. Moreover, once assembled, the defect would be virtually impossible for a worker, or an inspector to locate in conventionally constructed systems. However, in accordance with the invention, the use of a transparent fitting 12 in conjunction with opaque conduit segments 11' and 11", permits a worker or an inspector to easily ascertain that the joint is defective and the defect can then be corrected before the system is put into operation, at a minimum of expense and without any inconvenience to the owner of the system.

Figure 3:
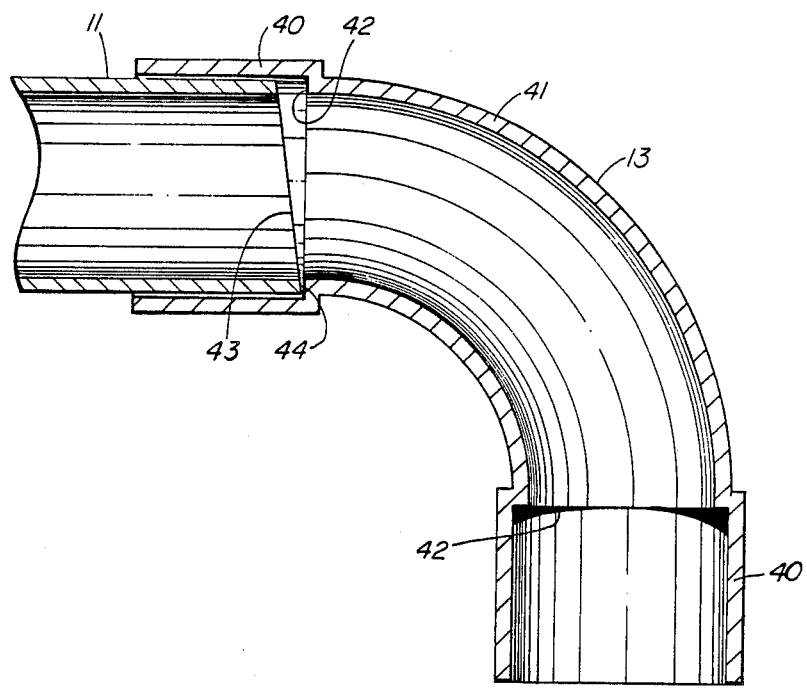
FIG. 3 is a cross-section of a 90° fitting with the end of a conduit segment inserted in one end thereof.

FIG. 3 depicts a typical 90° elbow fitting 13 with a conduit segment 11 inserted in one end thereof. This fitting differs somewhat from the straight connector depicted in FIG. 2, in that the fitting is provided with enlarged ends 40 separated by a slightly reduced body portion 41. A radially extending circumferential inner flange 42 forms the base of a socket, the walls of which are defined by the inner surface of the enlarged end 40, to snugly receive the end of a conduit segment 11. As in the case of the straight connector 12 illustrated in FIG. 2, the width of the flange 42 corresponds to the thickness of the tubular wall of conduit segment 11 so that, if cut perfectly square and smooth, the end of the conduit segment will abut flush against the flange 42 to produce a smooth virtually uninterrupted flow surface from the inner flow passage of conduit segment 11 to the inner flow passage of 90° elbow 13. However, end 43 of the conduit segment illustrated, has been cut on a bias so that it touches flange 42 at one point 44 but is spaced therefrom to a varying degree at all other points.

Figure 4:
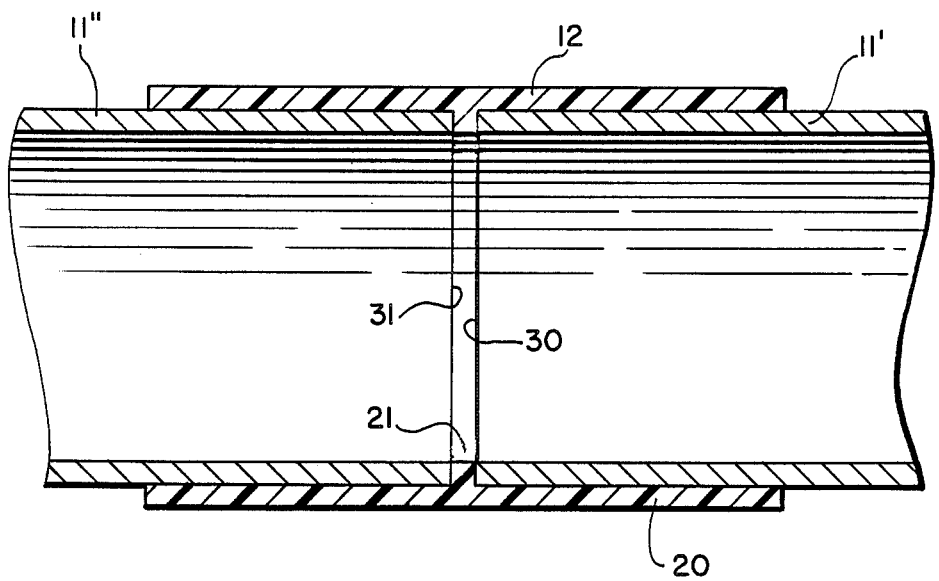
FIG. 4 is a cross-section of a straight connector fitting with the ends of two conduit segments inserted therein, and showing the conduit segment ends continuously abutting the peripheral shoulder.

FIG. 4 illustrates the connector 12 as it appears when the ends 30 and 31 of respective conduit segments 11' and 11" form a perfect junction with the radially projecting inner shoulder 21. It can be seen from FIG. 4 that this junction is characterized by the conduit segment ends continuously abutting the peripheral shoulder, with no gaps or irregularities which might lead to future blockage. The subject invention allows ready detection of a joint which departs from that shown in FIG. 4.

Again, as in the situation depicted in FIG. 2, through the use of a transparent fitting and an opaque conduit segment, the imperfect junction between conduit segment 11 and 90° elbow 13 can be readily determined by the workers installing the system, or, subsequently, by an inspector. In a conventional installation the defective junction could not be discovered after assembly, and would likely lead to eventual blockage of the flow path at some point in the life of the system.

It will be apparent that the advantages of the invention can be achieved if only the socket portion of the fittings are transparent, and the ends of the conduit segments opaque. However it will obviously be much easier to manufacture conduit and fittings which are uniformly opaque and transparent throughout, and this is preferred.

It is important that at least the ends of the conduit be opaque so that the relationship between the conduit end and the base of the socket in the fitting can be readily ascertained. This is difficult to do if both are transparent, and, of course, impossible, if the fitting, or at least the socket, is opaque.

What I claim as my invention is:

1. In or for a conduit system for central vacuum cleaning installations: at least one conduit segment, and at least one fitting having a fluid flow passage therein for attachment to an end of said conduit segment, an inwardly projecting peripheral shoulder of predetermined radial width disposed within said fitting and defining with said fluid flow passage at least one socket in said fitting for snug retention of said conduit segment end therein, said conduit segment end being adapted to continuously abut said peripheral shoulder upon full insertion of said conduit segment end into said socket, the thickness of the wall of said conduit segment end in abutment with said shoulder being substantially equal to said width of said shoulder, said conduit segment and said fitting forming a continuous fluid flow passage when said conduit segment end is received within said fitting, at least said end of said conduit segment being opaque, and at least said socket portion of said fitting being transparent, whereby to permit visual inspection of said abutting relationship between said conduit segment end and said peripheral shoulder.

2. A conduit system as defined in claim 1 comprising a plurality of said conduit segments and a plurality of said fittings.

3. A conduit system as defined in claim 1 wherein said peripheral shoulder comprises a transversely disposed internal circumferential flange located at a predetermined distance from an end of said fitting.

4. A conduit system as defined in claim 1 wherein said continuous fluid flow passage is defined by the internal cross-sections of said conduit segment and said fitting.

5. A conduit system as defined in claim 4 wherein said continuous fluid flow passage through said conduit segment and said fitting is circular in cross-section and of constant diameter.

6. A conduit system as defined in claim 1 wherein said conduit segments are composed entirely of opaque material and said fittings are composed entirely of transparent material.

* * * * *